United States Patent [19]

Sheppard

[11] Patent Number: 5,340,165
[45] Date of Patent: Aug. 23, 1994

[54] FLEXIBLE CONNECTOR

[75] Inventor: Michael W. Sheppard, Batavia, Ill.

[73] Assignee: Senior Engineering Investments, B.V., Amsterdam, Netherlands

[21] Appl. No.: 720,223

[22] Filed: Jun. 21, 1901

Related U.S. Application Data

[63] Continuation-in-part of Ser. No. 476,838, Feb. 8, 1990, Pat. No. 5,069,487.

[51] Int. Cl.$^5$ .............................................. F16L 27/00
[52] U.S. Cl. ................................... 285/226; 285/227; 285/299
[58] Field of Search ............... 285/226, 263, 227, 228, 285/299, 300

[56] References Cited

U.S. PATENT DOCUMENTS

| | | | |
|---|---|---|---|
| 2,451,252 | 10/1948 | Stoeckly | 285/90 |
| 2,484,087 | 10/1949 | Hauf | 285/196 |
| 2,616,728 | 11/1952 | Pitt | 285/11 |
| 2,712,456 | 7/1955 | McCreery | 285/90 |
| 3,029,094 | 4/1962 | Parlasca et al. | 285/114 |
| 3,259,405 | 7/1966 | Heller | 285/226 |
| 3,369,829 | 2/1968 | Hopkins | 285/226 X |
| 3,420,553 | 1/1969 | Poxon et al. | 285/49 |
| 3,459,444 | 8/1969 | Rofe | 285/226 |
| 3,627,354 | 12/1971 | Toepper | 285/55 |
| 3,770,303 | 11/1973 | Hallett | 285/45 |
| 3,820,829 | 6/1974 | Hasselbacher et al. | 285/226 |
| 3,869,151 | 3/1975 | Fletcher et al. | 285/114 |
| 3,915,482 | 10/1975 | Fletcher et al. | 285/226 |
| 3,997,194 | 12/1976 | Eifer et al. | 285/226 X |
| 4,251,094 | 2/1981 | Pinto | 285/382.5 |
| 4,283,078 | 8/1981 | Ross et al. | 285/45 |
| 4,408,785 | 10/1981 | Legros et al. | 285/49 |
| 4,445,332 | 5/1984 | Thies et al. | 60/455 |
| 4,498,449 | 5/1984 | Halling et al. | 285/263 |
| 4,526,405 | 7/1985 | Schaefer | 285/114 |
| 4,553,775 | 11/1985 | Halling | 285/55 |
| 4,659,117 | 4/1987 | Holzhausen et al. | 285/49 |
| 4,792,161 | 12/1988 | Usui | 285/45 |

FOREIGN PATENT DOCUMENTS

| | | | |
|---|---|---|---|
| 835378 | 3/1952 | Fed. Rep. of Germany . | |
| 1047529 | 12/1958 | Fed. Rep. of Germany . | |
| 2035757 | 1/1972 | Fed. Rep. of Germany | 285/226 |
| 3544712 | 6/1987 | Fed. Rep. of Germany . | |
| 658066 | 5/1929 | France | 285/226 |
| 671291 | 12/1929 | France | 285/226 |
| 1244446 | 9/1960 | France . | |
| 2101806 | 3/1972 | France . | |
| 6502305 | 8/1965 | Netherlands . | |
| 7101090 | 7/1972 | Netherlands | 285/226 |
| 893510 | 4/1962 | United Kingdom . | |
| 1315634 | 5/1973 | United Kingdom . | |

OTHER PUBLICATIONS

Flexonics Inc. technical drawing No. 311-300-9001 Released for production Feb. 4, 1980.

Primary Examiner—Eric K. Nicholson
Attorney, Agent, or Firm—Dick and Harris

[57] ABSTRACT

A flexible connector for connecting adjacent ends of substantially successive pipes in an exhaust system. An input coupler and an output coupler have at least one articulated joint arranged between them. A flexible tubular bellows substantially surrounds at least part of the input and output couplers, as well as the at least one articulated joint. A flexible closure member substantially surrounds the bellows to protect it from external forces.

6 Claims, 4 Drawing Sheets

_Fig 4_          _Fig 5_

_Fig 6_

FLEXIBLE CONNECTOR

This is a continuation-in-part of U.S. patent application Ser. No. 07/476,838, filed Feb. 8, 1990 now U.S. Pat. No. 5,069,487. The present invention relates to connectors for joining the ends of successive lengths of pipe or conduit, and in particular to connectors for joining the ends of successive pipes in an exhaust system for vehicles.

It is well known that, in vehicle exhaust systems, particularly those for heavy duty vehicles, such as large trucks, the motors produce a significant amount of vibration in the exhaust pipes. Operation of the motors at continuous speeds for prolonged periods of time can, especially, produce what are known as harmonic vibrations which can cause significant deflections in extended lengths of exhaust pipe. Repeated deflections of the exhaust pipe will, in turn, cause the pipe to weaken with time and ultimately fail. Further, such harmonic vibrations will also be transmitted through the exhaust pipes to the mountings of the pipes, promoting the loosening of the mountings, which can result in the sudden displacement of one or more components of the exhaust system, with the potential for both personal injury and equipment damage.

In addition to the vibrations created by the motor of the vehicle, an exhaust system is also subjected to various tension, compression and bending forces which arise during the operation of the vehicle. While individual components might be made stronger and more massive to resist failure by fatigue, such construction would be undesirable due to weight considerations. Further, by making individual elements stiffer, the vibrations are merely transmitted to the exhaust system mountings or other components, not reduced or eliminated. Accordingly, it is desirable to isolate the exhaust system, or at least components of the system from such vibrations and forces.

It is known that if the pipes of an exhaust system are divided and separated by non-rigid connections, rather than as continuous extended lengths, the development of harmonic vibrations from the motor is precluded or reduced. Such nonrigid connections can be advantageously employed to absorb other tension, compression and bending forces, in addition to motor vibrations.

It is therefore desirable to provide a connector for joining successive lengths of exhaust pipe, which coupler joins the pipes in a non-rigid fashion and is capable of absorbing tension, compression and bending forces, without transmitting them from one pipe to the next.

One proposed solution to this problem has been to provide a flexible connector with a more durable liner within the corrugated member. U.S. Pat. Nos. 3,869,151 and 3,915,482 to Fletcher et al. disclose a flexible duct joint in which a pair of coaxial sleeves are encased by a bellows. The bellows is restricted from extension by a gimbal ring which is fixed to a mid-span of the bellows. This approach eliminates axial and lateral flexibility in the connector and consequently restricts the relative displacement which the connector is capable of absorbing.

U.S. Pat. No. 2,451,252 to Stoekly discloses a flexible conduit joint for an aircraft exhaust system in which an intermediate line is supported at opposite ends by ball joints. One of the joints is also a slip joint and is individually enveloped by a bellows. Because only one joint permits axial motion and because the bellows does not span both joints, the connector has limited flexibility. In order to provide for the lateral offsetting of the two joined conduits, two of the disclosed joints must be utilized, as disclosed in that reference.

An additional problem encountered with automobile exhaust system connectors is the difficulty in effectively managing heat. Engines of automobiles are being operated at increasing levels of engine heat. Typical connectors have poor insulating properties and often do an inadequate job of transferring heat away for the engine and instead permit the engine heat to be dissipated from the connector into the engine compartment and/or near the passenger compartment.

Prior art connectors also may typically rely upon sealing members placed directly between adjacent, relatively moving coupler members in order to maintain a fluid-light seal and present the escape of exhaust fumes. Such sealing members, being exposed to extreme heat and vibrations, are prone to failure.

It is therefore an object of this invention to provide a flexible connector for placement between successive lengths of exhaust pipe for damping and blocking the transmission of vibration and other forces from one length of the pipe to the next, which coupler is durable and not subject to attack by dirt, debris and the elements.

Yet another object of the invention is to provide a flexible connector which does not require or utilize a sealing means positioned between juxtaposed coupler members, which may cause the seal to prematurely yield, requiring replacement of the connector.

It is further an object of this invention to provide a flexible connector for exhaust pipes which provides means for mechanically connecting the ends of the pipes to be joined, which means are themselves protected from interference and/or degradation by external forces and elements.

Still yet another object of the invention is to provide a flexible connector for exhaust pipe systems which provides improved audio isolation to reduce or preclude migration of motor noise into the passenger compartment of the vehicle.

A still further object of the invention is to provide a flexible connector which has improved heat insulation characteristics to more effectively transfer exhaust heat along the exhaust system and preclude transmission of heat into the engine and/or passenger compartments of the vehicle.

These and other objects of the invention will become apparent in light of the present specification, claims and drawings.

SUMMARY OF THE INVENTION

The present invention comprises a flexible connector for sealably connecting adjacent ends of substantially successive pipes in an exhaust system in either a collinear, angled, offset parallel or skewed successive orientation. The flexible connector is configured to preclude transmission of vibration between the pipes, as well as to prevent the transmission of noise and heat from the connector into motor and/or passenger compartments of the vehicle.

The flexible connector includes an input coupler member connectable to one of the adjacent ends of a first of the successive pipes, and an output coupler member connectable to the another of the adjacent ends of the second of the successive pipes.

At least one articulated joint is located between the input coupler member and the output coupler member to accommodate relative axial and angular movement between the coupler members. A flexible tubular bellows, with bellows portions arranged adjacent to at least its ends, substantially surrounds the at least one articulated joint, and as well also substantially surrounds portions of the input and output coupler members, to maintain the successive pipes in flexibly secured, sealed, joined relation to each other regardless of their successive orientation, to accommodate axial and angular movement of the input and output coupler members relative to each other.

In order to accommodate and dampen lateral vibrations and displacements along the exhaust system, means are provided for accommodating lateral offsetting of the input and output coupler members, operably arranged in the at least one articulated joint. Specifically, the ends of the coupler members on which the mating surfaces are formed, are fabricated to be sufficiently resilient to accommodate elastic deformation of the articulated joint. In particular, the coupler members may become laterally deflected, to absorb excess transient lateral forces.

An embodiment of the invention provides two articulated joints between the coupler members, with the joints being formed by the ends of the coupler members and the respective ends of a tubular liner arranged between the coupler members.

In an alternative preferred embodiment of the invention, only one articulated joint directly connects the input and output coupler members, and the combination together acts as a liner. In this embodiment, the articulated joint is formed by tubular elements at the adjacent ends of the coupler members which have mating surfaces formed thereon. The input coupler member may have mating surfaces formed as a convex spherical or ellipsoidal outwardly projecting surface. The output coupler member may have mating surfaces formed as a tube of circular, elliptical or polygonal cross-section, or as a concave spherical inwardly projecting surface (receiving a circular tube input coupler end).

In the two joint embodiment, the mating surfaces are formed on either the input or output coupler members and the respective adjacent ends of the tubular liner.

In a preferred embodiment of the invention, a flexible closure member surrounds the flexible tubular bellows along its entire length to protect the bellows from external contact.

Another feature of the invention, as when utilized in an automobile exhaust system, is that the bellows and interior elements of the connector are spaced such that an annular cavity is defined which serves to provide thermal isolation between the bellows and the hot exhaust gases flowing through the interior components. The impermeability of the interior components in conjunction with the layer of thermal insulation protects the bellows from exposure to damaging temperatures so that the bellows may be composed of a less expensive material. The improved insulation of this connector results in efficient heat management for conducting engine heat away from the automobile passenger compartment.

Yet another feature of the invention is that the smooth inner surfaces of the inner components reduce the flow-resisting friction along the interior of the connector. By minimizing the resistance to flow, the back pressure of the flow is reduced and the engine operates at higher efficiency.

A movement damping spacer member may be arranged between the mating surfaces of the coupler members to provide frictional resistance to relative axial and angular movement.

BRIEF DESCRIPTION OF THE DRAWINGS

FIG. 7b is a sectional view taken along line 7b of the articulated joint shown in FIG. 7a;

FIG. 8b is a section view taken along line 8b of the articulated joint shown in FIG. 8a;

FIG. 12b is a sectional view taken along line 12b of the articulated joint shown in FIG. 12a;

FIG, 14a is a longitudinal section of an articulated joint in which the input liner and output liner have a multi-ply construction.

DETAILED DESCRIPTION OF THE INVENTION

While this invention is susceptible of embodiment in many different forms, there is shown in the drawings and will be described herein in detail, several embodiments, with the understanding that the present disclosure is to be considered as an exemplification of the principles of the invention and is not intended to limit the invention to the embodiments illustrated.

Figure 1:
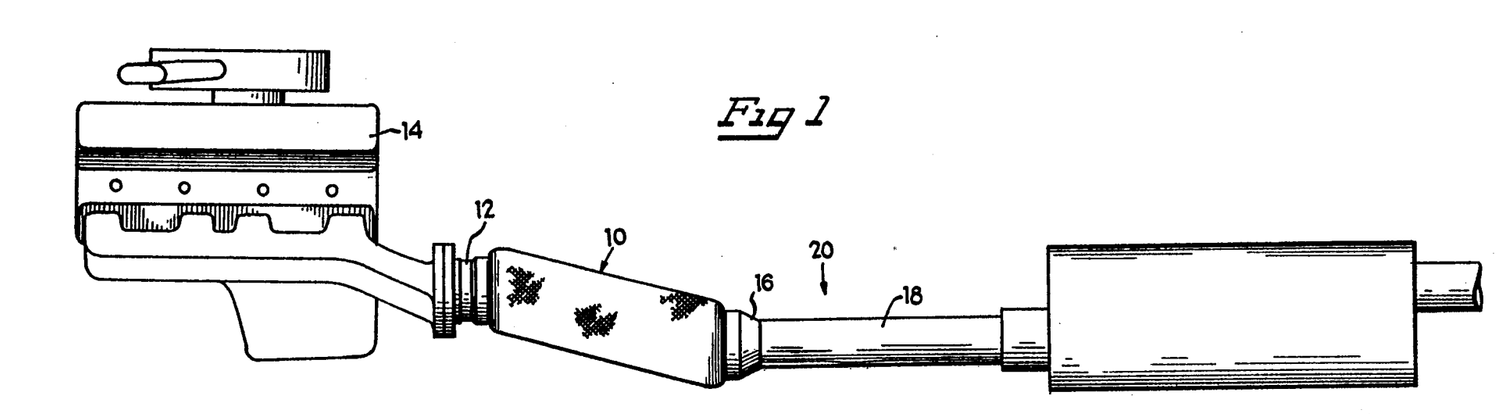
FIG. 1 is a diagrammatic illustration of one embodiment of the flexible connector in the exhaust system of an internal combustion engine.

A flexible connector embodying the features of the present invention is shown in FIG. 1 generally at 10, connected at end 12 to internal combustion engine 14 and attached at opposite end 16 to noise suppressing muffler assembly 18 of typical automobile exhaust system 20.

Figure 2:
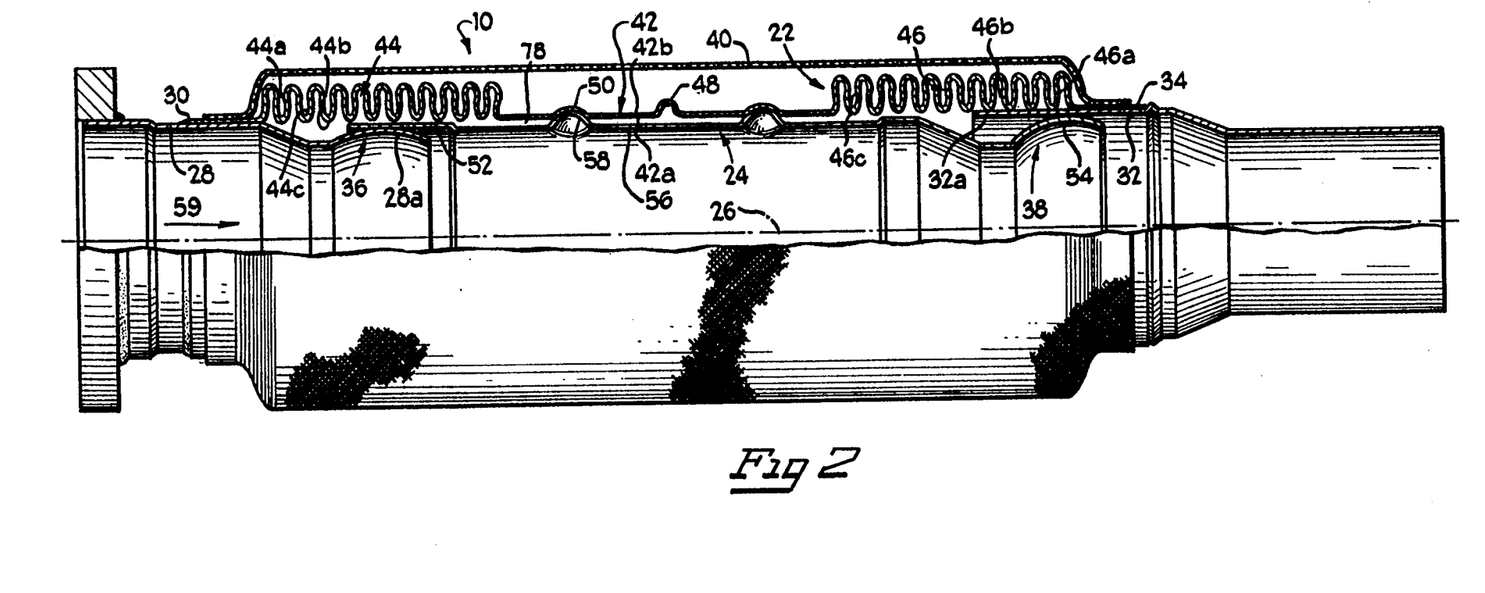
FIG. 2 is a longitudinal section through the connector of FIG. 1.
Figure 3:
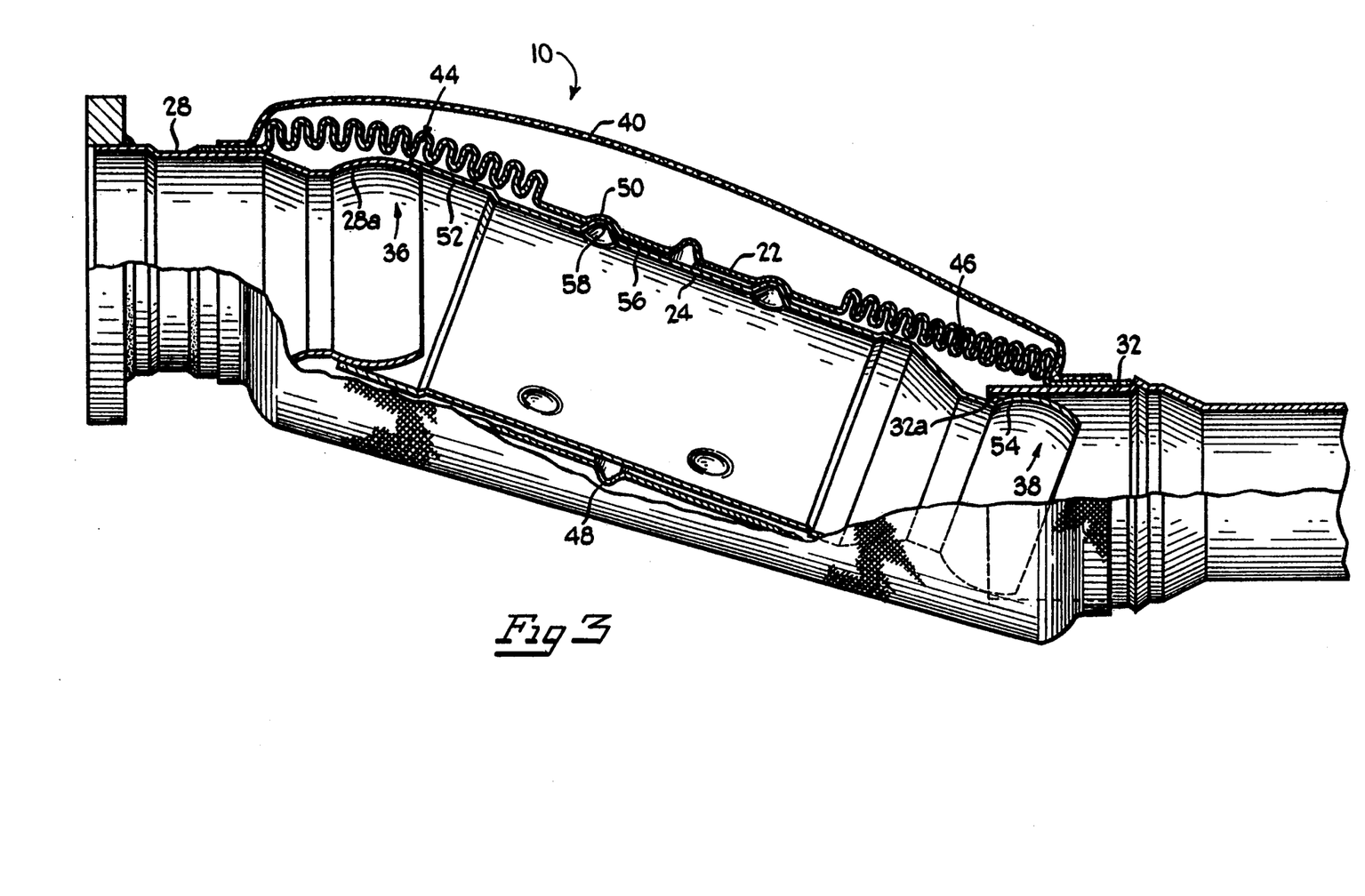
FIG. 3 is a longitudinal section showing the connector displaced as shown in FIG. 1.

Referring now to FIGS. 2 and 3, flexible connector 10 has tubular bellows 22 concentrically surrounding inner tubular liner 24. Liner 24 extends along longitudinal axis 26, between input coupler 28 at upstream end 30 of the bellows, and output coupler 32 at downstream end 34 of the bellows. Articulated joints 36 and 38 flexibly connect liner 24 with couplers 28 and 32, respectively, and are enveloped by bellows 22. Protective structure 40 in the form of a braided cover envelops bellows 22.

Bellows 22 comprises an elongated metal tube having a non-corrugated central portion 42 extending longitudinally between corrugated end portions 44 and 46. Corrugated end portion 44 has corrugations 44a defining inner corrugated surface 44b and outer corrugated surface 44c, and corrugated end portion 46 has corrugations 46a defining inner corrugated surface 46b and outer corrugated surface 46c. Non-corrugated central portion 42 has inner surface 42a and outer surface 42b with circumferential rib 48 formed thereon to enhance the structural rigidity of central portion 42. A plurality of dimples 50 are formed on either side of strengthening rib 48, with a preferred embodiment having a set of three or four equidistantly spaced dimples on either side of rib 48.

Liner 24 comprises an elongated, resilient metal tube having cylindrical end surface 52 and opposite spherical end surface 54 separated by central liner surface 56 containing a plurality of dimples 58. Dimples 58 are provided in a complementary formation with dimples 50 of enveloping bellows 22 such that dimples 50 and 58 interlock and prohibit relative axial displacement of liner 24 and bellows 22.

Couplers 28 and 32 are formed of light gauge resilient metal. Articulated joint 36 is defined by the mating of cylindrical end surface 52 of liner 24 with spherical end surface 28a of input coupler 28. Articulated joint 38 is defined by the mating of spherical end surface 54 with cylindrical surface 32a of output coupler 32. Articulated joints 36 and 38 provide a flexible junction of rigid liner 24 with couplers 28 and 32, respectively to accommodate relative angular and axial movement of couplers 28 and 32 and liner 24. The direction of the spherical end surface 28a of input coupler 28 and spherical end surface 54 of liner 24 ensure desirable thermal insulating characteristics of the connector when flow travels through the connector in a direction extending from input coupler 28 toward output coupler 32 as shown by the arrow 59.

Because of varied underbody configurations of different automobiles, and further due to displacement forces attributable to combustion engine dynamics, it is not always possible to operate the connector in a fixed orientation with couplers 28 and 32 in a coaxial relationship. As shown in FIG. 3, rotational flexibility of connector 10 is provided by corrugated sections 44 and 46 of bellows 22, and by the articulated geometry of joints 36 and 38. As the axes of the couplers are relatively disoriented, the corrugated sections of the bellows flexibly accommodate the deformation. Although liner 24 is rigid, liner cylindrical end surface 52 and spherical surface 54 are flexibly coupled with spherical end surface 28a and cylindrical surface 32a of couplers 28 and 32 for free angular movement such that the liner can freely adapt to the deformed orientation of the bellows.

It is also possible for each of articulated joints 36 and 38 to accommodate relative axial displacement of liner 24 and couplers 28 and 32 and thereby function as combined slip and ball joints. This feature is useful in conforming with engine vibratory displacements generally, including the relatively large displacements associated with the vibratory roll modes of an automobile engine, and particularly engine roll of the increasingly popular front wheel drive vehicle.

In addition to an internal combustion engine, an automobile powerplant typically includes a number of rotating and reciprocating components which operate at relatively high frequency. These components tend to vibrate the structure on which they are mounted, and in many cases, the vibrations are transmitted to the engine. These vibrations are usually of small amplitude and result in engine displacements which are easily absorbed by the connector. Engine roll displacements, as will be described, are more significant.

During the operation of an internal combustion engine with rotary masses, the engine generates drive torques which are reacted to by the engine mountings on the vehicle frame. To minimize dynamic shock and stresses in the frame the engine mountings are somewhat elastic, such that the periodic torques generated by the engine result in oscillatory roll of the engine.

Figure 4:
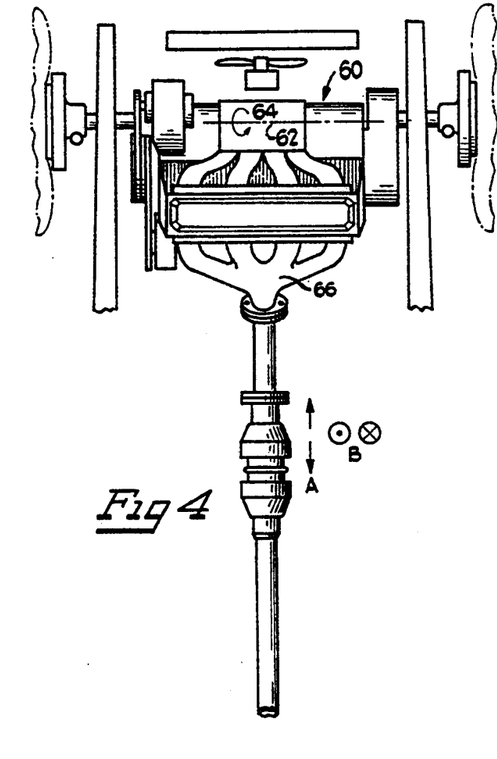
FIG. 4 is a diagrammatic illustration of the flexible connector in an exhaust system of a vehicle having a transversely mounted front wheel drive engine.
Figure 5:
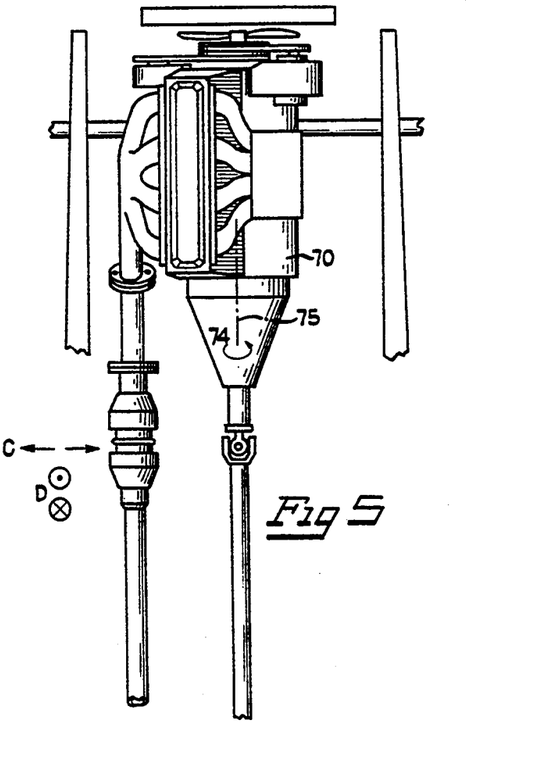
FIG. 5 is a diagrammatic illustration of the flexible connector in an exhaust system of a vehicle having a longitudinally mounted rear wheel drive engine.

FIG. 4 is a side view of a portion of the drive train of a front wheel drive vehicle. Engine 60 is mounted transversely to exhaust system 66 for packaging considerations commonly known in the manufacture of front wheel drive vehicles. Internal combustion engine 60 is induced to roll about roll center axis 62 in a direction indicated by arrow 64. It can be seen that engine roll about axis 62 of engine 60 results in fore/aft displacement of exhaust system 66 in a direction indicated by the arrow A, as well as vertical displacement indicated by symbols B (perpendicular to the plane of the drawing). By comparison, FIG. 5 is an end view of a portion of the drive train of a rear wheel drive vehicle. Design considerations require the engine 70 to be mounted in parallel alignment with the exhaust system 72. As indicated by arrow 74, roll of the rear wheel drive engine 70 about roll center axis 75 produces a left/right displacement of the exhaust system 72 in the direction indicated by the arrow C, as well as vertical displacement indicated by the symbols D (perpendicular to the plane of the drawing).

In the case of both front wheel drive and rear wheel drive automobiles, engine roll results in displacement of the vehicle exhaust system. In the rear drive case, however, a few degrees of engine roll laterally displaces the forward end of the exhaust system a few inches but the displacement is flexibly substantially distributed over the total length of the exhaust system. Left/right displacement of a few inches at the forward end of the exhaust system results in negligible displacement of the rearward end of the exhaust system.

In the case of front wheel drive, however, the same engine roll displaces the forward end of the exhaust system axially. This axial displacement is not distributed and is instead transmitted directly along the entire length of the exhaust system, resulting in appreciable displacement of the complete exhaust system. This axial thrusting of the exhaust system normally poses a distinct problem for rigidly connecting the engine of a front wheel drive vehicle with an exhaust discharge means.

The connector of the present invention eliminates the axial thrusting of the entire exhaust system by absorbing the axial displacements within the connector. Due to the interlocked dimples 50, on central portion 42 of bellows 22, and dimples 58, on central liner surface 56 of liner 24, the liner is prevented from shifting axially relative to the bellows. However, liner 24 is free to shift axially relative to couplers 28 and 32, and interengaged bellows/liner assembly 22/24 will thereby permit axial extension and compression of connector 10.

This arrangement provides an articulated rigid liner comprising a low cost, flexible shield for preventing flowing gases from impinging with the corrugated inner surfaces of the bellows, and thereby reduces the noise attributed to vibratory excitement of the corrugations. The combined slip and ball joints accommodate a wide range of relative movement of the couplers, with the relative axial displacement of the couplers absorbing exhaust system displacement attributable to vibration and engine roll.

In an application where hot gases flow through the connector, it is desirable to isolate the flexible material of the bellows from the high temperatures to which the interior of the liner is subjected. When couplers 28 and 32 are joined with bellows 22 and liner 24 as described above, interior annular cavity 78 is established between liner 24 and surfaces 42, 44b, and 46b of bellows 22. Annular cavity 78 defines a layer of such thermal insulation between the bellows and the liner whereby exposure of the bellows to damaging temperatures is reduced. Because the temperatures to which the bellows is exposed are reduced, it is not necessary for the bellows material to be capable of withstanding severe heat, and it is possible to construct the bellows of a less expensive material.

The insulation layer also acts to efficiently dissipate engine heat, transferring the thermal energy away from the engine and towards a downstream gas discharge means. By efficiently transferring heat away from the engine, heat exchange with the engine compartment and/or interior of the passenger compartment is significantly reduced. Improved heat transfer also enhances the operation of catalytic converters commonly found in engine emission control systems. Catalytic converters act to catalyze unburned gases in the exhaust flow to ensure that they are burned prior to expulsion the atmosphere. Catalytic converters do not operate efficiently until they reach a sufficiently high temperature, and in the first few minutes after an engine is started, the catalytic converter is cool and permits substantial emissions to be exhausted. When the connector is mounted between the engine and the catalytic converter, the connector provides a conductive heat transfer path so the catalytic converter heats rapidly and efficiently reduces exhaust pollutants.

In an operating environment in which external shielding of the connector is desired, braided protective structure 40 prevents damage to the exterior of the bellows, and further eliminates the risk of serious injury or fire through inadvertent contract with the heated bellows.

An additional feature of the present invention, in this and the following embodiments, is that the provision of a liner or similar element provides a substantially smooth inner surface to the connector, thus reducing resistance to the exhaust flow, improving the back pressure on the engine and thus improving engine performance and efficiency.

Figure 6:
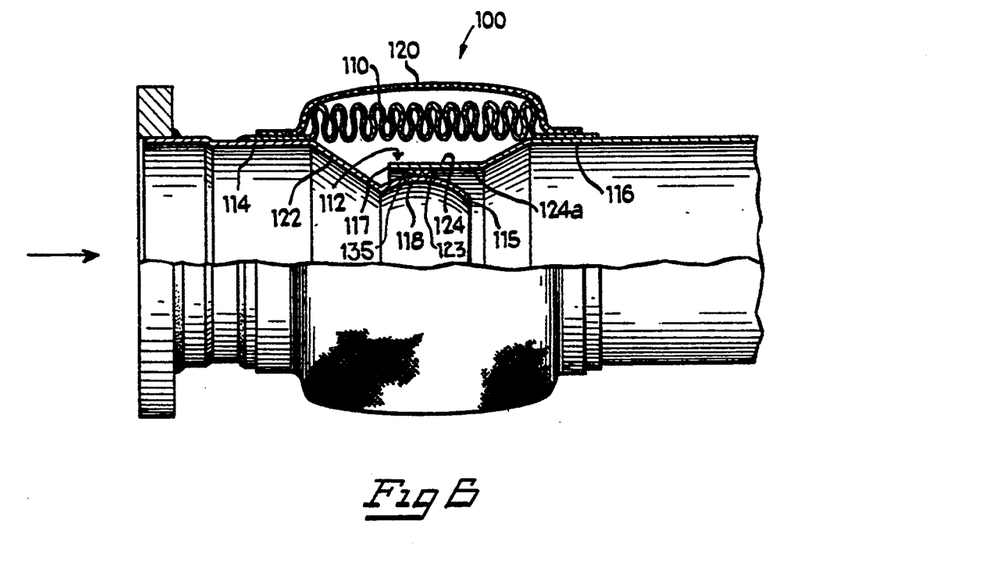
FIG. 6 is a longitudinal section of an alternate embodiment of the flexible connector having an articulated joint.

An alternate embodiment of a connector illustrating the invention is shown diagrammatically in FIG. 6. Fluid flow is indicated by the arrow at the left. Flexible connector 100 has a tubular metal conduit or bellows 110 surrounding inner conduit 112. Conduit 112 includes tubular input coupler 114 having end 115 and tubular output coupler 116 having end 117. Ends 115 and 117 are arranged in an overlapping, telescoped configuration and define articulated joint 118 between the telescoped ends to allow relative axial and angular displacement of the input coupler and output coupler. The combined input and output couplers, together with the joint forced therebetween act as the liner in the previous embodiment to define impart the air gap which the bellows surrounds, providing the desired audio and thermal isolation, and protecting the bellows from the heat of the exhaust gases. Protective structure 120 in the form of a braided cover envelops bellows 110. Nonsealing gasket 135 may be provided between coupler ends 115 and 117.

Input coupler 114 has conical inwardly extending portion 122 terminating in spherical outwardly projecting end surface 123 which engages interior face 124a of cylindrical end surface 124 formed on output coupler 116, whereby articulated joint 118 assumes the characteristics of a combined slip and ball connection. Referring to the similar embodiment of FIGS. 7a and 7b, with spherical end surface 123 having a profile of circular cross section 125, annular gap 126 exists between end surfaces 123 and 124 while the connector is in an undeformed configuration.

The single ball joint connector performs much like the double-jointed connector of the previous embodiment. FIGS. 7a–b, 8a–b, 9, 10, 11, 12a–b, 13, 14a–b show various embodiments of the single articulated joint. In each, the arrow indicates the direction of flow. Relative angular rotation of the input coupler and the output coupler is accommodated by the rotational degrees of freedom of the ball joint and the flexibility of the bellows. Axial displacements are absorbed by relative displacement of telescoped ends 115 and 117. However, in the previously described double ball joint arrangement, lateral offset of connected members could be accommodated by rotation at each of the couplers 28 and 32. In the present embodiment, however, lateral offset cannot be accommodated through pure rotation of the single articulated joint 118.

Figure 7A:
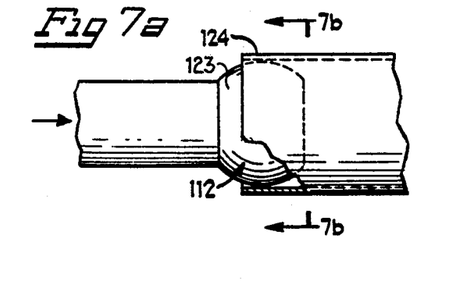
FIG. 7a is a diagrammatic illustration of the articulated joint shown in FIG. 6 in an aligned undeformed configuration.
Figure 7B:
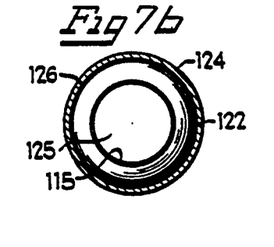

Accordingly, input coupler 114 and output coupler 116 are formed of light gauge, resilient metal which is well suited to absorb transverse forces and displacements tending to laterally offset the couplers. In the presence of transverse forces, such as the forces developed in the above described engine roll modes, deformation of telescoped ends 115 and 117 allows relative lateral displacement of couplers 114 and 116, with end surfaces 123 and 124 acting as springs and resiliently distorting articulated joint 118. FIGS. 7a and 7b show an embodiment of the connector, without a gasket, in an undeformed configuration, with annular gap 126 separating the entire periphery of end surface 123 from the end surface 124 and providing limited radial freedom therebetween.

Figure 8A:
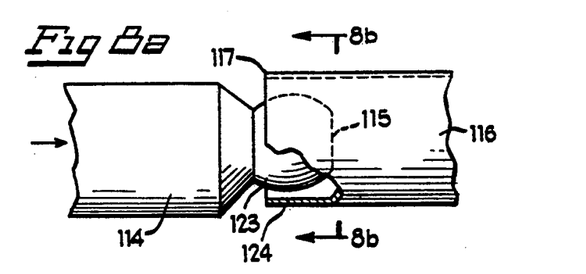
FIG. 8a is a diagrammatic illustration of the articulated joint shown in FIG. 7a in a laterally offset deformed configuration.
Figure 8B:
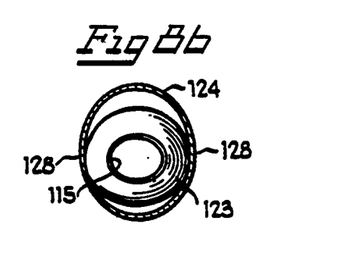
Figure 9:
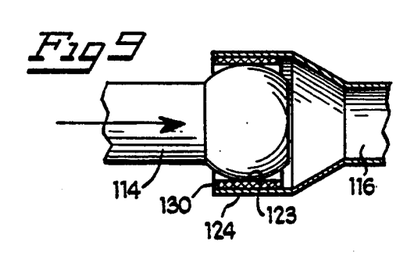
FIG. 9 is a longitudinal section of a connector having an annular friction gasket between the opposite mating surfaces of the articulated joint.
Figure 10:
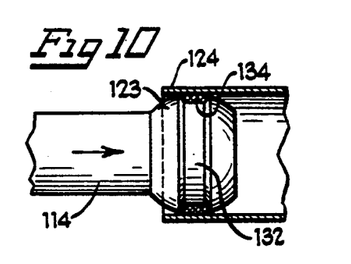
FIG. 10 is a longitudinal section of an articulated joint having a friction gasket seated in a groove on one of the mating surfaces of the joint.
Figure 11:
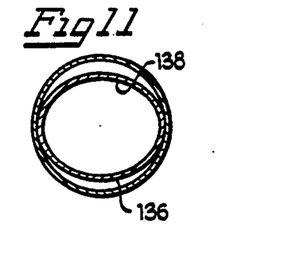
FIG. 11 is a sectional view of an alternative articulated joint in which one of the mating surfaces has an elliptical profile.

As lateral forces are applied at joint 118 of the connector, surfaces 123 and 124 elastically deform and allow couplers 114, 116 to become laterally offset (shown slightly exaggerated in FIGS. 8a, 8b). Deformation of telescoped ends 115 and 117 results in areas of contact 128 between surfaces 123 and 124 as the ends are forced against with each other. Because of the deformation of ends 115 and 117, the area of contact between the two couplers is increased from that normally occurring between completely rigid contacting curved surfaces. The contact forces are distributed over the increased area and the contact stresses are thereby reduced over those occurring with a more rigid construction. When the transverse forces subside, the surfaces elastically restore to their initial configuration.

In order to have the necessary resilient deformability, the wall thicknesses of the couplers can be no more than a maximum relative to the overall diameter of the articulated joint. In particular, a diameter to wall thickness ratio of at least 50 to one has been found to usually provide the desired deformability and resiliency.

In order to dampen the axial movement of the telescoped ends, gasket 130 (FIG. 9), comprising an annular friction element is supported between telescoped end surfaces 123 and 124, to resist relative motion between the input coupler 114 and output coupler 116 and to eliminate metal-to-metal contact between the end surfaces distortion of the connector. The gasket may be formed from numerous materials, such as wire mesh, ceramic fibers, or foil. In an alternative embodiment, shown in FIG. 10, circumferential groove 132 is formed on end surface 123 of input coupler 114 and seats arcuate gasket 134, which extends over approximately 30 to 35 degrees of the circumference of spherical surface 123. Gasket 130 (like gasket 135 in FIG. 6) is non-sealing, sealing being provided by the bellows (110 in FIG. 6).

Figure 12A:
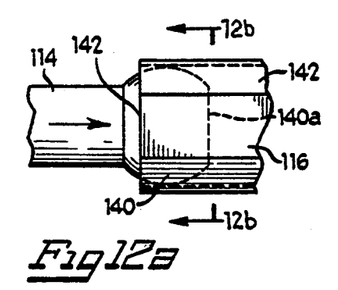
FIG. 12a is a side elevational view of an alternative articulated joint in which one of the mating surfaces has a polygonal cross section.
Figure 12B:
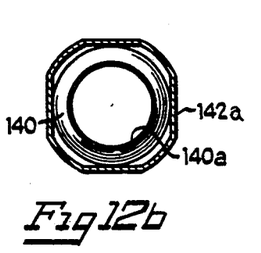
Figure 13:
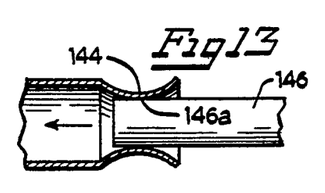
FIG. 13 is a longitudinal section of a connector having an alternative arrangement of the opposed mating surfaces which comprise the articulated joint.
Figure 14A:
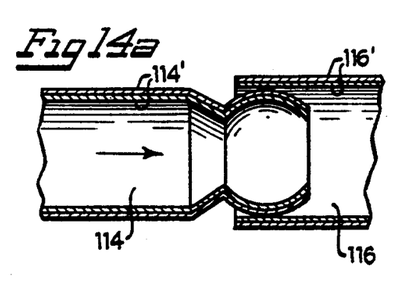
Figure 14B:
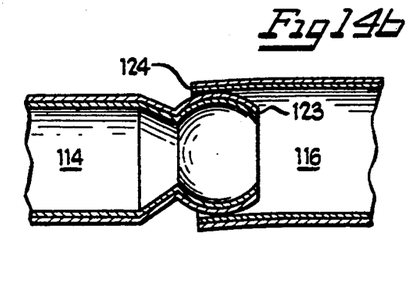
FIG. 14b is a longitudinal section of the articulated joint shown in FIG. 14a with the input liner and the output liner in a laterally deformed state.

As an alternative embodiment of the flexible connector shown in both FIGS. 1-3 and 6, the present invention also contemplates a connector in which one arcuate end surface 136 has an ellipsoidal profile and elliptical cross section 138 (FIG. 11), or alternatively, an embodiment in which end surface 140 is a spherical surface having a circular cross section 140a and in which output coupler 116 is formed as a multi-sided tube 142, having polygonal end cross section 142a (FIGS. 12a and 12b). Alternatively, arcuate end surface 144 could be an inwardly projecting spherical surface for engaging exterior face 146a of mating cylindrical end surface 146, as shown in FIG. 13.

In some applications, input coupler 114 and output coupler 116 have a laminated or multi-ply construction (FIGS. 14a and 14b), with coupler 114 comprising a number of adjacent layers 114' and output coupler 116 comprising a number of adjacent layers 116'. In these situations, lateral displacement of the liners is damped by friction forces acting between the layers. As suggested by FIG. 14b, lateral deformation of end surfaces 123 and 124 tends to move the adjacent plies axially relative to each other. Friction acting between the plies resists the axial shifting and therefore the transverse displacement.

The single deformable slip and ball joint design has a number of advantages. Because the connector is relatively short, when it is mounted in a horizontal plane it is has a higher lateral stiffness than longer connectors and is capable of supporting greater exhaust system weight without requiring additional hangers. By absorbing a wide range of relative movement of the couplers, the connector absorbs substantial exhaust system energy and reduces exhaust system dynamic displacement and wear between the moving parts.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible connector for sealably connecting adjacent ends of a first pipe having a first longitudinal axis in a substantially successive relationship with a second pipe having a second longitudinal axis in an exhaust system, in either a colinear, angled, offset-parallel or skewed successive orientation, to direct fluid flow from one of said pipes to the other of said first and second pipes, while precluding transmission of vibration between said pipes, said flexible connector comprising:

an input coupler member, connectable to one of said adjacent ends of said first of said successive pipes;

an output coupler member connectable to the other of said adjacent ends of said second of said successive pipes;

at least one articulated joint means arranged between said input coupler member and said output coupler member, said at least one articulated joint means being configured to enable substantially unrestricted angular movement of said input and output coupler members relative to each other, said at least one articulated joint means being configured to enable a range of axial movement of the coupler members relative to each other, said at least one articulated joint means including mating portions;

flexible tubular bellows means, having two ends, with bellows portions arranged adjacent to at least said two ends, said tubular bellows means substantially surrounding said at least one articulated joint means, said ends of said tubular bellows means also substantially surrounding at least portions of said input and output coupler members, respectively, to maintain said first and second successive pipes in flexibly secured, sealed, joined relation to each other regardless of said successive orientation, to accommodate ranges of axial and angular movement of the input and output coupler members relative to each other; and means for accommodating lateral offsetting of said input and output coupler members, operably arranged in one or more of said at least one articulated joint means, so as to enable said one or more of said at least one articulated joint means to accommodate angular and axial movement, and lateral offsetting, to, in turn, be capable of operably and successively connecting said first and second successive pipes when said first and second longitudinal axes are in a non-intersecting orientation, said means for accommodating lateral offsetting of said input and output coupler members including said mating portions of said at least one articulated joint means being resiliently fabricated so as to undergo elastic deformation during the application of stress transversely to said at least one articulated joint means, said at least one articulated joint means being fabricated from tubular elements, each tubular element having a predetermined wall thickness, and the at least one articulated joint means having an overall diameter, such that the ratio of the overall diameter to the wall thickness of each said tubular element is at least 50 to 1.

2. A flexible connector for sealably connecting adjacent ends of a first pipe having a first longitudinal axis in a substantially successive relationship with a second pipe having a second longitudinal axis, in an exhaust system, in either a colinear, angled, offset-parallel or skewed successive orientation, to direct fluid flow from one of said pipes to the other of said pipes, while precluding transmission of vibration between said first and second pipes, said flexible connector comprising:

an input coupler member, connectable to one of said adjacent ends of said first of said successive pipes;

an output coupler member connectable to the other of said adjacent ends of said second of said successive pipes;

two articulated joint means arranged between said input coupler member and said output coupler member, at least one of said two articulated joint means being configured to enable substantially unrestricted angular movement of said input and output coupler members relative to each other, at least one of said two articulated joint means being configured to enable a range of axial movement of the coupler members relative to each other, at least one of said two articulated joint means including mating portions;

flexible tubular bellows means, having two ends, with bellows portions arranged adjacent to at least said two ends, said tubular joint means, said ends of said tubular bellows means also substantially surrounding at least portions of said input and output coupler members, respectively, to maintain said first and second successive pipes in flexibly secured, sealed, joined relation to each other regardless of said successive orientation, to accommodate ranges of axial and angular movement of the input and output coupler members relative to each other;

tubular liner means operably arranged between said two articulated joint means, inside of said tubular bellows means, said tubular liner means, said input and output coupler members and said tubular bellows means, defining an air gap region, providing thermal and audio insulation and protecting said tubular bellows means from excess heat from said exhaust gases, said tubular liner means including a substantially cylindrical central portion, with a circumferentially disposed outwardly-projecting stiffening ridge arranged therearound; and at least one pair of interengaging outwardly extending projections operably disposed in said central portion of said tubular liner means, and in said central portion of said tubular bellows means to preclude relative axial movement between said tubular liner means and said central portion of said tubular bellows means;

a first of said two articulated joint means being formed from opposed mating surfaces on the outside surface of a free end of the input coupler member and on an inner surface of a first end of said tubular liner means, a second of said two articulated joint means being formed from opposed mating surfaces formed on an outside surface of a second end of the tubular liner means, and on an inside surface of the output coupler member;

said mating surface of said input coupler member being formed as a convex, spherical outwardly-projecting surface, and said mating surface at said second end of said tubular liner means being formed as a convex spherical outwardly-projecting surface; and means for accommodating lateral offsetting of said input and output coupler members, operably arranged in at least one of said two articulated joint means, so as to enable said at least one of said two articulated joint means to accommodate angular and axial movement, and lateral offsetting, to, in turn, be capable of operably and successively connecting said first and second successive pipes when said first and second longitudinal axes are in a non-intersection orientation.

3. A flexible connector for sealably connecting adjacent ends of a first pipe having a first longitudinal axis in a substantially successive relationship with a second pipe having a second longitudinal axis in an exhaust system, in either a colinear, angled, offset-parallel or skewed successive orientation, to direct fluid flow from one of said pipes to the other of said pipes, while precluding transmission of vibration between said first and second pipes, said flexible connector comprising:

an input coupler member, connectable to one of said adjacent ends of said first of said successive pipes;

an output coupler member connectable to the other of said adjacent ends of said second of said successive pipes;

at least one articulated joint means arranged between said input coupler member and said output coupler member, said at least one articulated joint means being configured to enable substantially unrestricted angular movement of said input and output coupler members relative to each other, said at least one articulated joint means being configured to enable a range of axial movement of the coupler members relative to each other, said at least one articulated joint means including mating portions, said at least one articulated joint means including two tubular elements having opposed mating surfaces, one tubular element disposed on a free end of the input coupler member, with the mating surface disposed on an outer surface thereof, and the other tubular element disposed on a free end of the output coupler member, with the other mating surface disposed on an inner surface thereof, said tubular element of the input coupler member having a circular cross-sectional configuration, the tubular element of the output coupler member having a substantially polygonal cross-sectional configuration, and said mating surface of said tubular element of said input coupler member being formed as a spherical, outwardly-projecting surface;

flexible tubular bellows means, having two ends, with bellows portions arranged adjacent to at least said two ends, said tubular bellows means substantially surrounding said at least one articulated joint means, said ends of said tubular bellows means also substantially surrounding at least portions of said input and output coupler members, respectively, to maintain said first and second successive pipes in flexibly secured, sealed, joined relation to each other regardless of said successive orientation, to accommodate ranges of axial and angular movement of the input and output coupler members relative to each other, said at least one articulated joint means, said input coupler member and said output coupler member thereby forming a liner defining, at least in part, an air gap region between said liner and said tubular bellows means, providing thermal and audio insulation and protecting said tubular bellows means from excess heat form exhaust gases; and means for accommodating lateral offsetting of said input and output coupler members, operably arranged in one or more of said at least one articulated joint means, so as to enable said one or more of said at least one articulated joint means to accommodate angular and axial movement, and lateral offsetting, to, in turn, be capable of operably and successively connecting said first and second successive pipes when said first and second longitudinal axes are in a non-intersection orientation.

4. A flexible connector for sealably connecting adjacent ends of a first pipe having a first longitudinal axis in a substantially successive relationship with a second pipe having a second longitudinal axis in an exhaust system, in either a colinear, angled, offset-parallel or skewed successive orientation, to direct fluid flow from one of said pipes to the other of said pipes, while precluding transmission of vibration between said first and second pipes, said flexible connector comprising:

an input coupler member, connectable to one of said adjacent ends of said first of said successive pipes;

an output coupler member connectable to the other of said adjacent ends of said second of said successive pipes;

at least one articulated joint means arranged between said input coupler member and said output coupler member, said at least one articulated joint means being configured to enable substantially unrestricted angular movement of said input and output coupler members relative to each other, said at least one articulated joint means being configured to enable a range of axial movement of the coupler members relative to each other, said at least one articulated joint means including mating portions, said at least one articulated joint means including two tubular elements having opposed mating surfaces, one tubular element disposed on a free end of the input coupler member, with the mating surface disposed on an outer surface thereof, and the other tubular element disposed on a free end of the output coupler member, with the other mating surface disposed on an inner surface thereof, said tubular element of the input coupler member having a circular cross-sectional configuration, the tubular element of the input coupler member having a substantially elliptical cross-sectional configuration, said mating surface thereon having a convex, elliptical cross-sectional configuration and a convex, ellipsoidal, outwardly-projecting surface;

flexible tubular bellows means, having two ends, with bellows portions arranged adjacent to at least said two ends, said tubular bellows means substantially surrounding said at least one articulated joint means, said ends of said tubular bellows means also substantially surrounding at least portions of said input and output coupler members, respectively, to maintain said first and second successive pipes in flexibly secured, sealed, joined relation to each other regardless of said successive orientation, to accommodate ranges of axial and angular movement of the input and output coupler members relative to each other, said at least one articulated joint means, said input coupler means and said output coupler member thereby forming a liner defining, at least in part, an air gap region between said liner and said tubular bellows means, providing thermal and audio insulation and protecting said tubular bellows means from excess heat from exhaust gases; and means for accommodating lateral offsetting of said input and output coupler members, operably arranged in one or more of said at least one articulated joint means, so as to enable said one or more of said at least one articulated joint means to accommodate angular and axial movement, and lateral offsetting, to, in turn, be capable of operably and successively connecting said first and second successive pipes when said first and second longitudinal axes are in a non-intersecting orientation.

5. A flexible connector for sealably connecting adjacent ends of a first pipe having a first longitudinal axis in a substantially successive relationship with a second pipe having a second longitudinal axis in an exhaust system, in either a colinear, angled, offset-parallel or skewed successive orientation, to direct fluid flow from one of said pipes to the other of said first and second pipes, while precluding transmission of vibration between said pipes, said flexible connector comprising:

an input coupler member, connectable to one of said adjacent ends of said first of said successive pipes, and having a convex, spherical, outwardly-projecting surface, having an annular slot arranged circumferentially therein;

an output coupler member connectable to the other of said adjacent ends of said second of said successive pipes, and having a cylindrical inner surface;

at least one articulated joint means arranged between said input coupler member and said output coupler member, said at least one articulated joint means being configured to enable substantially unrestricted angular movement of said input and output coupler members relative to each other, said at least one articulated joint means being configured to enable a range of axial movement of the coupler members relative to each other, said at least one articulated joint means including mating portion;

said at least one articulated joint means including two tubular elements having opposed mating surfaces, one tubular element disposed on a free end of the input coupler member, with the mating surface disposed on said outer surface thereof, and the other tubular element disposed on a free end of the output coupler member, with the other mating surface disposed on said inner surface thereof, flexible tubular bellows means, having two ends, with bellows portions arranged adjacent to at least said two ends, said tubular bellows means substantially surrounding said at least one articulated joint means, said ends of said tubular bellows means also substantially surrounding at least portions of said input and output coupler members, respectively, to maintain said first and second successive pipes in flexibly secured, sealed, joined relation to each other regardless of said successive orientation, to accommodate ranges of axial and angular movement of the input and output coupler members relative to each other.

said at least one articulated joint means, said input coupler member and said output coupler member thereby forming a liner defining, at least in part, an air gap region between said liner and said tubular bellows means, providing thermal and audio insulation and protecting said tubular bellows means from excess heat from exhaust gases;

a substantially porous, vibration-absorbing spacer member, formed as a flexible annular member, operably arranged between the mating surfaces of the input and output coupler members, to provide frictional resistance to relative axial and angular movement between the input and output coupler members, positioned within the inner surface of the output coupler member and substantially circumscribing the convex, spherical, outwardly-projecting surface of the input coupler member, said flexible annular member being arranged within said annular slot; and means for accommodating lateral offsetting of said input and output coupler members, operably arranged in one or more of said at least one articulated joint means, so as to enable said one or more of said at least one articulated joint means to accommodate angular and axial movement, and lateral offsetting, to, in turn, be capable of operably and successively connecting said first and second successive pipes when said first and second longitudinal axes are in a non-intersecting orientation.

6. A flexible connector for sealably connecting adjacent ends of a first pipe having a first longitudinal axis in a substantially successive relationship with a second pipe having a second longitudinal axis in an exhaust system, in either a colinear, angled, offset-parallel or skewed successive orientation, to direct fluid flow from one of said pipes to the other of said first and second pipes, while precluding transmission of vibration between said pipes, said flexible connector comprising:

an input coupler member, connectable to one of said adjacent ends of said first of said successive pipes;

an output coupler member connectable to the other of said adjacent ends of said second of said successive pipes;

said input and output coupler members each being fabricated from concentrically disposed inner and outer layers of tubular material, wherein the inner and outer layers are free to undergo limited, frictionally resistive relative axial and lateral movement;

at least one articulated joint means arranged between said input coupler member and said output coupler member, said at least one articulated joint means being configured to enable substantially unrestricted angular movement of said input and output coupler members relative to each other, said at least one articulated joint means being configured to enable a range of axial movement of the coupler members relative to each other, said at least one articulated joint means including mating portions;

said at least one articulated joint means including two tubular elements having opposed mating surfaces, one tubular element disposed on a free end of the input coupler member, with the mating surface disposed on an outer surface thereof, and the other tubular element disposed on a free end of the output coupler member, with the other mating surface disposed on an inner surface thereof;

flexible tubular bellows means, having two ends, with bellows portions arranged adjacent to at least said two ends, said tubular bellows means substantially surrounding said at least one articulated joint means, said ends of said tubular bellows means also substantially surrounding at least portions of said input and output coupler members, respectively, to maintain said successive first and second pipes in flexibly secured, sealed, joined relation to each other regardless of said successive orientation, to accommodate ranges of axial and angular movement of the input and output coupler members relative to each other;

said at least one articulated joint means, said input coupler member and said output coupler member thereby forming a liner defining, at least in part, an air gap region between said liner and said tubular bellows means, providing thermal and audio insulation and protecting said tubular bellows means from excess heat from exhaust gases; and means for accommodating lateral offsetting of said input and output coupler members, operably arranged in one or more of said at least one articulated joint means, so as to enable said one or more of said at least one articulated joint means to accommodate angular and axial movement, and lateral offsetting, to, in turn, be capable of operably and successively connecting said first and second successive pipes when said first and second longitudinal axes are in a non-intersecting orientation.

* * * * *

UNITED STATES PATENT AND TRADEMARK OFFICE
CERTIFICATE OF CORRECTION

PATENT NO. : 5,340,165
DATED : August 23, 1994
INVENTOR(S) : Michael W. Sheppard It is certified that error appears in the above-indentified patent and that said Letters Patent is hereby corrected as shown below:

Col. 11, Line 30        After "tubular" insert -- bellows means substantially surrounding said two articulated --.

Col. 14, Line 68        After "other" delete "." and insert -- ; --.

Field [22]              Delete "1901" and insert instead -- 1991 --.

Signed and Sealed this

Eighteenth Day of April, 1995

Attest:

BRUCE LEHMAN

*Commissioner of Patents and Trademarks*

*Attesting Officer*